(12) United States Patent
Hori et al.

(10) Patent No.: US 8,419,282 B2
(45) Date of Patent: Apr. 16, 2013

(54) FLUID DYNAMIC BEARING DEVICE AND PROCESS FOR MANUFACTURING THE SAME

(75) Inventors: Masaharu Hori, Kuwana (JP); Isao Komori, Kuwana (JP)

(73) Assignee: NTN Corporation, Osaka-shi (JP)

( * ) Notice: Subject to any disclaimer, the term of this patent is extended or adjusted under 35 U.S.C. 154(b) by 429 days.

(21) Appl. No.: 12/446,870

(22) PCT Filed: Aug. 6, 2007

(86) PCT No.: PCT/JP2007/065355
§ 371 (c)(1),
(2), (4) Date: Apr. 23, 2009

(87) PCT Pub. No.: WO2008/065780
PCT Pub. Date: Jun. 5, 2008

(65) Prior Publication Data
US 2010/0002966 A1    Jan. 7, 2010

(30) Foreign Application Priority Data

Nov. 30, 2006  (JP) ................................. 2006-323367

(51) Int. Cl.
*F16C 32/06* (2006.01)
(52) U.S. Cl.
USPC .......................................... 384/100; 384/107
(58) Field of Classification Search .................. 384/100, 384/107, 114, 115, 120, 121, 123; 29/898.02
See application file for complete search history.

(56) References Cited

U.S. PATENT DOCUMENTS

| | | | | |
|---|---|---|---|---|
| 6,390,681 B1 * | 5/2002 | Nakazeki et al. | ............ | 384/107 |
| 7,625,124 B2 * | 12/2009 | Satoji et al. | ................ | 384/107 |

| | | | | |
|---|---|---|---|---|
| 2006/0188187 A1 | 8/2006 | Kurimura et al. | | |
| 2009/0160277 A1 * | 6/2009 | Obara | ............................ | 310/90 |

FOREIGN PATENT DOCUMENTS

| | | |
|---|---|---|
| CN | 1821598 A | 8/2006 |
| JP | 2000-320542 A | 11/2000 |
| JP | 2003-232353 A | 8/2003 |
| JP | 2003-239974 A | 8/2003 |
| JP | 2005-163903 A | 6/2005 |
| JP | 2005-337490 A | 12/2005 |
| JP | 2006-194384 A | 7/2006 |
| JP | 2006-226410 A | 8/2006 |
| WO | WO2005/119072 | * 12/2005 |

OTHER PUBLICATIONS

International Search Report of PCT/JP2007/065355, Mailing Date of Nov. 6, 2007.
Notification of Transmittal of Translation of the International Preliminary on Patentability (form PCT/IB/338) of International Application No. PCT/JP/2007/065355 with Forms PCT/IB/373 and PCT/ISA/237.
Chinese Office Action, issued Jun. 9, 2010 for corresponding Chinese Patent Application No. 2007-80040542.X.

* cited by examiner

*Primary Examiner* — James Pilkington
(74) *Attorney, Agent, or Firm* — Westerman, Hattori, Daniels & Adrian, LLP

(57) ABSTRACT

Fixation strength of a bearing sleeve with respect to a housing is increased so that stable bearing performance can be achieved. A fluid dynamic bearing device (1) includes a housing (7) and a bearing sleeve (8) fixed to an inner periphery of the housing (7). The housing (7) and the bearing sleeve (8) have therebetween a press-fitting part (10) at which the housing (7) and the bearing sleeve (8) are fixed by press-fitting, and an adhesive-filled part (11) formed on an opening side with respect to the press-fitting part (10).

9 Claims, 6 Drawing Sheets

FLUID DYNAMIC BEARING DEVICE AND PROCESS FOR MANUFACTURING THE SAME

BACKGROUND OF THE INVENTION

1. Field of the Invention

The present invention relates to a fluid dynamic bearing device and a method of manufacturing the same.

2. Description of Related Art

A fluid dynamic bearing device is a bearing device that rotatably supports a shaft member with a fluid film of a lubricating fluid formed in a bearing gap. The fluid dynamic bearing device is one having characteristics such as high-speed rotation, excellent rotational accuracy, and quietness. In recent years, by taking advantage of those characteristics, the fluid dynamic bearing device is suitably used as a bearing device for a motor to be mounted to various electrical apparatuses such as information equipment. Specifically, as a bearing device for a motor, the fluid dynamic bearing device can be suitably used in the following: a spindle motor for an information apparatus such as a magnetic disk drive such as an HDD, an optical disk drive for a CD-ROM, CD-R/RW, DVD-ROM/RAM, or the like, or a magneto-optical disk drive for an MD, MO, or the like; a polygon scanner motor of a laser beam printer (LBP); a color wheel motor for a projector or the like; or a fan motor.

A well-known example of the fluid dynamic bearing device incorporated in a spindle motor for a disk drive or the like is illustrated in FIG. 7. A fluid dynamic bearing device 70 illustrated in the figure includes a bearing sleeve 78 fixed to an inner periphery of a housing 77, a shaft member 72 inserted into an inner periphery of the bearing sleeve 78, and radial bearing parts 75, 76 provided in radial bearing gaps between an outer peripheral surface of the shaft member 72 and an inner peripheral surface of the bearing sleeve 78. In terms of cost-reduction of the fluid dynamic bearing device, it is desirable that the number of components be as small as possible, and that shapes of the members be as simple as possible. In this context, in the fluid dynamic bearing device 70 illustrated in the figure, the housing 77 is formed in a bottomed cylindrical shape (cup shape) in which a side part and a bottom part are integrated with each other (refer to Patent Documents 1 and 2, for example).

Patent Document 1: JP 2003-232353 A
Patent Document 2: JP 2003-239974 A

SUMMARY OF THE INVENTION

Problems to be Solved by the Invention

In accordance with the recent development of higher capacity disk devices and the like, the number of disks mounted thereto tends to increase (multiple disks are layered). In order to increase detachment resistance (unmating force) of the shaft member and to stably maintain rotational accuracy despite increase in weight caused thereby, there is a demand for further increase in fixation strength with respect to the housing. In order to secure high fixation strength therebetween, there are proposed various fixation means. Actually, press-fit bonding (bonding involving press-fitting) by which high fixation strength can be easily secured is adopted in many cases.

Press-fit bonding therebetween is performed by hardening adhesive after the bearing sleeve is press-fitted to the inner periphery of the housing, to which adhesive is applied in advance, and then the bearing sleeve is positioned. However, there is a risk that, in accordance with the press-fitting of the bearing sleeve, the adhesive flows therearound to the forward side in the moving direction of the bearing sleeve, and the amount of the adhesive to be interposed between the inner peripheral surface of the housing and the outer peripheral surface of the bearing sleeve. In particular, in the structure in which the housing has a bottomed cylindrical shape as described in Patent Documents, the shaft member is inserted in advance into the housing. Thus, there is also a risk that the adhesive flowing therearound adheres to the shaft member. That is, those risks represent that desired fixation strength or desired bearing performance cannot be obtained therebetween.

It is therefore an object of the present invention to provide a fluid dynamic bearing device in which fixation strength of the bearing sleeve with respect to the housing is increased so that stable bearing performance can be achieved.

Further, another object of the present invention is to provide a method by which the bearing sleeve can be firmly fixed to the housing without involving deterioration in bearing performance.

In order to attain the above-mentioned objects, the present invention provides a fluid dynamic bearing device, including: a housing; and a bearing sleeve fixed to an inner periphery of the housing, the bearing sleeve having an inner peripheral surface which faces radial bearing gaps in which a fluid film of a lubricating fluid is formed so that a shaft to be supported is supported therewith in a radial direction, in which the housing and the bearing sleeve have therebetween a press-fitting part at which the housing and the bearing sleeve are fixed by press-fitting, and an adhesive-filled part formed on an opening side with respect to the press-fitting part.

As described above, the fluid dynamic bearing device of the subject application is characterized by including, between the housing and the bearing sleeve, a press-fitting part at which the housing and the bearing sleeve are fixed by press-fitting, and an adhesive-filled part formed on an opening side with respect to the press-fitting part. The volume of the adhesive-filled part can be arbitrarily set, and hence through appropriate setting thereof, it is possible to control the amount of the adhesive to be interposed between the housing and the bearing sleeve. Accordingly, as a result of additional interposition of the adhesive on the opening side of the press-fitting part, it is possible to additionally provide a part bonded in a gap-filling manner between the housing and the bearing sleeve, and hence it is possible to further increase fixation strength therebetween as compared with the case of merely performing press-fit bonding therebetween. Note that, the adhesive-filled part can be formed, for example, of a groove whose longitudinal direction extends in the axial direction of the bearing or the like provided in at least one of the inner peripheral surface of the housing and the outer peripheral surface of the bearing sleeve.

The fluid dynamic bearing device structured as described above can be manufactured through a process of press-fitting the bearing sleeve to the inner periphery of the housing, and then filling the adhesive-filled part with adhesive. In this way, adhesive filled after the bearing sleeve is press-fitted to the inner periphery of the housing, whereby it is possible to prevent the adhesive from flowing therearound, which is caused in accordance with the press-fitting of the bearing sleeve, and possible to prevent deterioration in bearing performance. Then, after this process, the adhesive filled in the adhesive-filled part is introduced to the outer periphery of the bearing sleeve by an appropriate means, whereby a part bonded in a press-fitting manner is formed between the housing and the bearing sleeve, and high fixation strength can be secured therebetween. Note that, examples of a method of introducing adhesive to the outer periphery of the bearing sleeve include a method in which capillary force is utilized, a method in which vacuum suction is utilized, or a method obtained by combining those methods.

Examples of adhesive filled in the adhesive-filled part include thermosetting adhesive or anaerobic adhesive.

In the fluid dynamic bearing device of this type, negative pressure is generated at a part of a region in the interior space of the housing during bearing operation, and generation of air bubbles or the like in accordance therewith leads to deterioration in bearing performance in some cases. Thus, in the fluid dynamic bearing device of this type, for the purpose of preventing the generation of negative pressure, there is generally adopted the structure in which a communication path for communicating both end surfaces of the bearing sleeve each other is provided between the housing and the bearing sleeve so that, at the time of bearing operation, a lubricating fluid is allowed to circulate in the interior of the housing. However, in the case where the adhesive-filled part is provided between the housing and the bearing sleeve as described above, when the adhesive-filled part and the communication path is superimposed on each other at a circumferential position, there is a risk that the adhesive flowing into the communication path and the smooth fluid circulation of the lubricating fluid is hindered thereby. Accordingly, it is desirable that the adhesive-filled part be provided at a circumferential position different from that of the communication path.

In the above-mentioned structure, it is desirable that the housing be formed by injection molding of a resin. This is because, for example, when the housing is made of metal, there is a risk that the inner peripheral surface of the bearing sleeve is deformed in conformity with the shape of the inner peripheral surface of the housing so that width accuracy of the radial bearing gaps are deteriorated. Further, when the housing is formed by injection molding of a resin, increase in cost involved with complication of the shape can be suppressed as much as possible.

As described above, according to the present invention, it is possible to provide the fluid dynamic bearing device in which fixation strength of the bearing sleeve with respect to the housing is increased so that stable bearing performance can be achieved.

Further, according to the manufacturing method of the present invention, it is possible to increase the fixation strength of the bearing sleeve with respect to the housing without involving deterioration in bearing performance.

DETAILED DESCRIPTION OF THE INVENTION

Embodiments of the present invention are described below with reference to the drawings.

Figure 1:
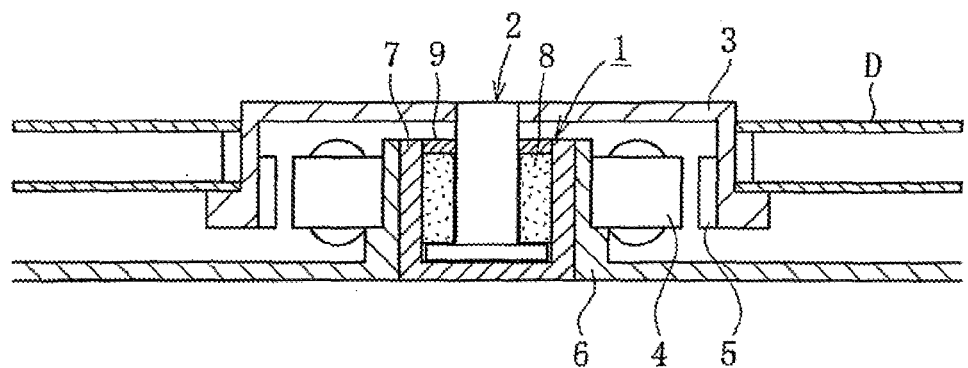
FIG. 1 is a schematic sectional view of a spindle motor for information equipment incorporating a fluid dynamic bearing device.

FIG. 1 conceptually illustrates a structural example of a spindle motor for information equipment incorporating a fluid dynamic bearing device. The spindle motor is used for a disk drive such as an HDD and includes the fluid dynamic bearing device 1 that rotatably supports a shaft member 2, a rotor (disk hub) 3 mounted on the shaft member 2, and a stator coil 4 and a rotor magnet 5 which are opposed to each other via, for example, a gap in a radial direction. The stator coil 4 is attached to an outer periphery of a bracket 6 and the rotor magnet 5 is attached to an inner periphery of the disk hub 3. A housing 7 of the fluid dynamic bearing device 1 is mounted on an inner periphery of the bracket 6. One or multiple disks D such as magnetic disks are held in the disk hub 3. When the stator 4 is energized, the rotor magnet 5 is rotated by electromagnetic force between the stator coil 4 and the rotor magnet 5. In accordance with the rotation, the disk hub 3 and the shaft member 2 integrally rotate.

Figure 2:
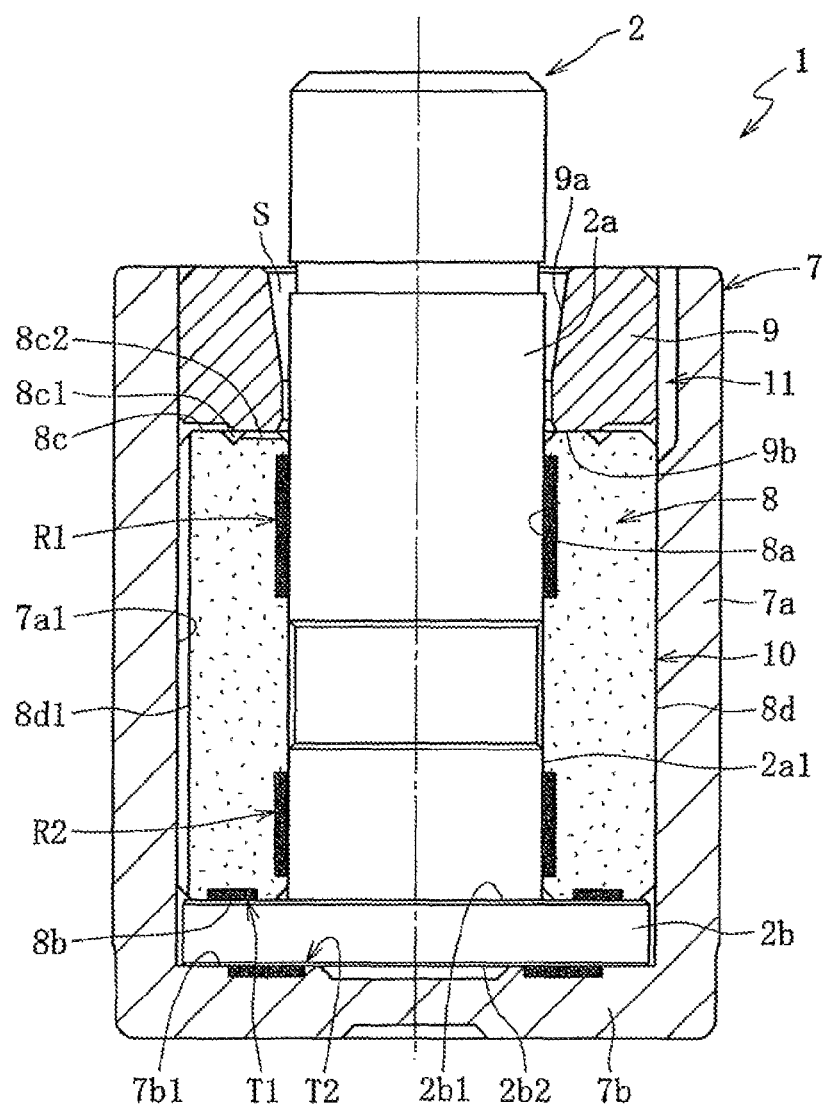
FIG. 2 is a sectional view illustrating a first embodiment of the fluid dynamic bearing device of the present invention.

FIG. 2 illustrates an embodiment of the fluid dynamic bearing device 1 of the present invention. The fluid dynamic bearing device 1 illustrated in the figure includes, as main components, the housing 7, a bearing sleeve 8 fixed to the housing 7, the shaft member 2 having a shaft part 2a which is inserted into the bearing sleeve 8, and a seal member 9 for sealing an opening at one end of the housing 7. Note that, for the sake of convenience in description, description is made on the assumption that the seal member 9 side is an upper side and the side axially opposite thereto is a lower side.

The shaft member 2 is formed of a metal material such as stainless steel and includes the shaft part 2a and a flange part 2b integrally or separately provided at a lower end of the shaft part 2a. The entire shaft member 2 is formed of a metal material. In addition, for example, the entire flange part 2b or a part (e.g., both end surfaces) of the flange part 2b may be formed of a resin. In this way, the shaft member 2 may be formed in the hybrid structure of the metal and the resin.

The bearing sleeve 8 is formed, in a cylindrical shape with a chamfered outer peripheral edge of a porous body of sintered metal, in particular a porous body of sintered metal containing copper as a main component. It goes without saying that a material forming the bearing sleeve 8 is not limited to sintered metal and it is also possible to form the bearing sleeve 8 with other metal materials that are not a porous body (e.g., soft metal such as brass). It is also possible to form the bearing sleeve 8 with a porous body other than sintered metal.

Figure 3A:
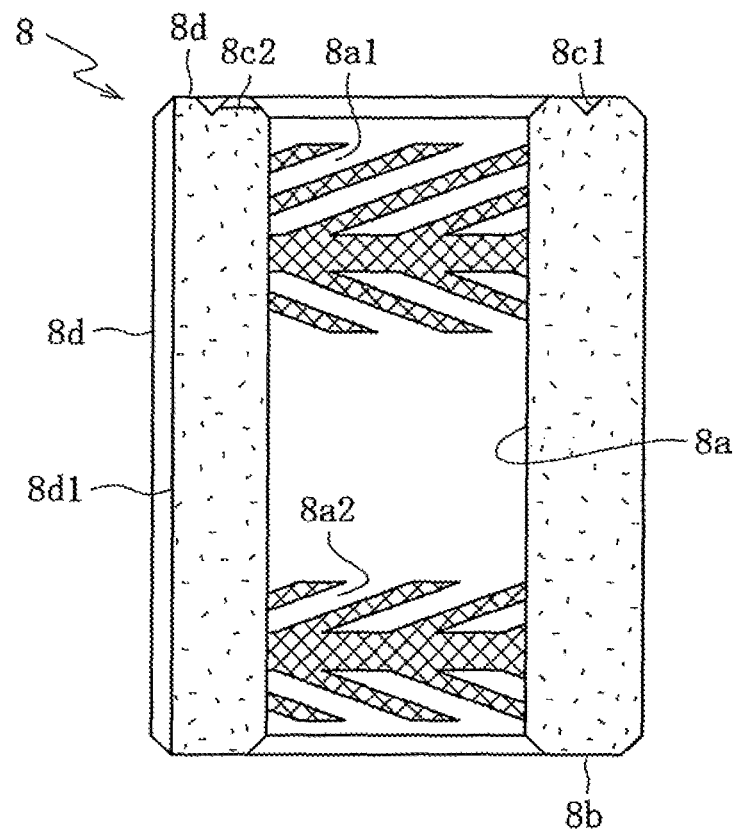
FIG. 3A is a vertical sectional view of a bearing sleeve.

On an inner peripheral surface 8a of the bearing sleeve 8, upper and lower two regions (solid regions in the figure) that constitute radial bearing surfaces of a first radial bearing part R1 and a second radial bearing part R2 are provided to be spaced apart from each other in an axial direction. In the two regions, dynamic pressure grooves 8a1 and 8a2 in, for example, a herringbone shape as illustrated in FIG. 3A are formed, respectively. The dynamic pressure grooves 8a1 on the upper side are formed asymmetrically in the axial direction with respect to an axial direction center m (center in the axial direction of upper and lower inclined inter-groove regions). An axial direction dimension X1 in a region high further on the upper side than the axial direction center m is set larger than an axial direction dimension X2 of a region further on the lower side than the axial direction center m. Note that, dynamic pressure grooves can be formed in an outer peripheral surface 2a1 of a shaft part 2a and a shape of the outer peripheral surface 2a1 can be other well-known shapes such as a spiral shape. One or multiple axial grooves 8*d*1 are formed in an outer peripheral surface 8*d* of the bearing sleeve 8. In this embodiment, the axial grooves 8*d*1 serving as communication paths for communicating both end surfaces 8*b* and 8*c* with each other are arranged at equal intervals at three points in a circumferential direction.

Figure 3B:
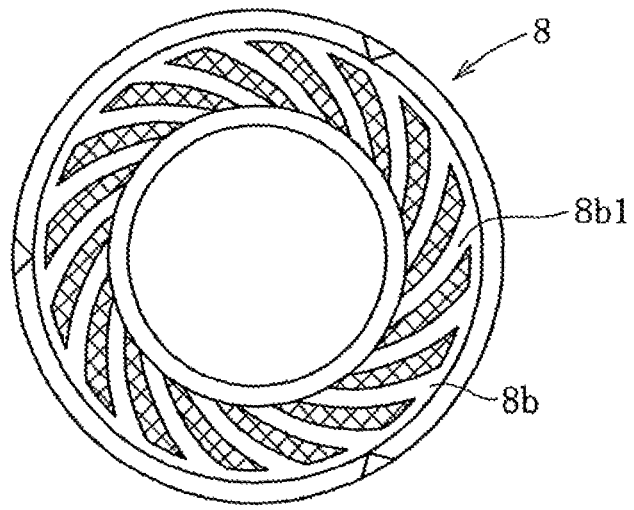
FIG. 3B illustrates a lower end surface of the bearing sleeve.

A region (solid regions in the figure) that constitutes a thrust bearing surface of a first thrust bearing part T1 is provided in a lower end surface 8*b* of the bearing sleeve 8. In the region, as illustrated in FIG. 3B, dynamic pressure grooves 8*b*1 arranged in, for example, a spiral shape are formed. The dynamic pressure grooves may be formed in an upper end surface 2*b*1 of a flange part 2*b* of the shaft member 2. A shape of the dynamic pressure groove 8*b*1 may be other well-known shapes such as a herringbone shape instead of the spiral shape.

Figure 4:
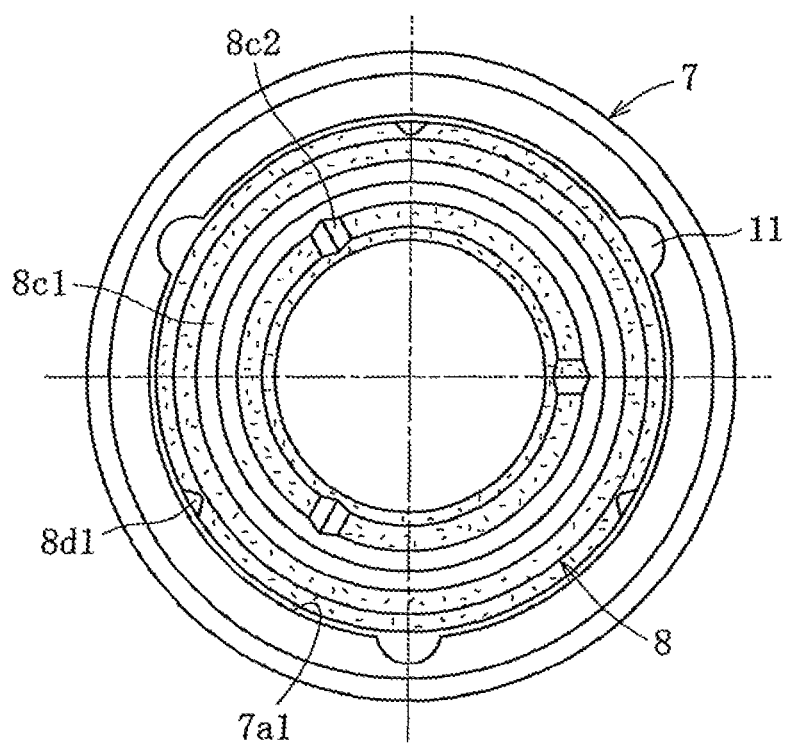
FIG. 4 is a top view of a housing and the bearing sleeve.

An annular groove 8*c*1 is formed in substantially the center in a radial direction of an upper end surface 8*c* of the bearing sleeve 8. One or multiple radial direction grooves 8*c*2 are connected to the annular groove 8*c*1. In this embodiment, as illustrated in FIG. 4, the radial direction grooves 8*c*2 are arranged at equal intervals at three points in the circumferential direction.

The housing 7 is formed by injection molding of a resin material, and has a bottomed cylindrical shape in which a cylindrical side part 7*a* and a bottom part 7*b* provided at the lower end of the side part 7*a* are integrated. Between the side part 7*a* and the bearing sleeve 8, there are provided a press-fitting part 10 formed by press-fitting the housing 7 and the bearing sleeve 8 to each other, and an adhesive-filled part 11 is formed on the opening side (upper part side) with respect to the press-fitting part 10. The adhesive-filled part 11 is constituted by an axial groove which is provided at one or multiple points in an inner peripheral surface 7*a*1 of the side part 7*a*, and as illustrated in FIG. 4, the axial grooves are arranged at equal intervals at three points in the circumferential direction. Further, the axial grooves serving as the adhesive-filled parts 11 are provided while being provided at circumferential positions different from those of the axial grooves 8*d*1 which are provided in the outer peripheral surface 8*d* of the bearing sleeve 8, more specifically, being provided by 60° of phase shift with respect to the axial grooves 8*d*1 of the bearing sleeve 8.

In an inner bottom surface 7*b*1 of the bottom part 7*b* of the housing 7, there is provided a region that constitutes the thrust bearing surface of the second thrust bearing part T2 (solid regions in the figure). In the region, multiple dynamic pressure grooves arranged in, for example, a spiral shape are formed (not shown). The dynamic pressure grooves may be formed in a lower end surface 2*b*2 of the flange part 2*b* of the shaft member 2. A shape of the dynamic pressure groove 8*b*1 may be other well-known shapes such as a herringbone shape.

As a resin forming the housing 7, a thermoplastic resin is mainly used. Examples of the usable non-crystalline resin include polysulfone (PSU), polyethersulfone (PES), polyphenylsulfone (PPSU), and polyetherimide (PEI). Examples of the usable crystalline resin include liquid crystal polymer (LCP), polyetheretherketone (PEEK), polybutyleneterephthalate (PBT), and polyphenylene sulfide (PPS). Further, a type of a usable filler filled to the above-resin is not specifically limited. It is possible to use, for example, fiber-like fillers such as glass fibers, whisker-like fillers such as potassium titanate, scale-like fillers such as mica, and fiber-like or powder-like conductive fillers such as carbon fiber, carbon black, graphite, carbon nano-material, and metal powder. Those fillers may be used independently or may be used in a mixed state of two or more kinds of fillers.

The seal member 9 is formed in a ring-like shape with use of an elastic metal material such as brass, another metal material, or a resin material, and is fixed to the inner periphery of the upper end of the housing 7 by an appropriate means such as press-fitting, bonding, or welding. A seal space S having a predetermined volume is formed between an inner peripheral surface 9*a* of the seal member 9 and the outer peripheral surface 2*a*1 of the shaft part 2*a*. In this embodiment, the inner peripheral surface 9*a* of the seal member 9 is formed in a tapered-surface shape while increasing upward in diameter. Accordingly, the seal space S exhibits a tapered shape while gradually decreasing downward in diameter. A radially-inner region of a lower end surface 9*b* of the seal member 9 is held in contact with the upper end surface 8*c* of the bearing sleeve 8 whereas an annular recessed part is formed in a radially-outer region. Accordingly, in this region, the seal member 9 is out of contact with the upper end surface 8*c* of the bearing sleeve 8.

The fluid dynamic bearing device 1 constituted by the above-mentioned components can be assembled, for example, by fixing, after the bearing sleeve 8 and the shaft member 2 are inserted into the inner periphery of the housing 7 while the shaft part 2*a* is inserted into the inner periphery of the bearing sleeve 8, the housing 7 to the bearing sleeve 8, and fixing the seal member 9 to the housing 7.

Specifically, first, the bearing sleeve 8 is press-fitted up to a predetermined position (position of securing the trust bearing gaps) on the inner periphery of the housing 7 while the shaft member 2 is inserted into the inner periphery thereof. In this case, the bearing sleeve 8 is positioned in a peripheral direction such that the axial grooves 8*d*1 provided in the outer peripheral surface 8*d* are provided at circumferential positions different from those of the axial grooves which are provided in the inner peripheral surface 7*a*1 of the housing 7 and which serve as the adhesive-filled parts 11, that is, they are provided by 60° of phase shift with respect to each other in this embodiment.

Next, the adhesive-filled parts 11 are filled with adhesive, for example, a predetermined amount of thermosetting adhesive, and then heating process is performed on the above-mentioned assembly. As a result of the heating process, the adhesive filled in the adhesive-filled parts 11 is softened, and the softened adhesive is drawn between the inner peripheral surface 7*a*1 of the housing 7 and the outer peripheral surface 8*d* of the bearing sleeve 8 by capillary force. Then, a heating state is maintained for a while so that the adhesive is hardened, whereby the bearing sleeve 8 is bonded (bonded by press-fitting) to the inner periphery of the housing 7.

In this way, the bearing sleeve 8 is fixed (press-fitted) in the housing 7 such that the axial grooves 8*d*1 provided in the outer peripheral surface 8*d* thereof are provided at circumferential positions different from those of the axial grooves which are provided in the inner peripheral surface 7*a*1 of the housing 7 and which serve as the adhesive-filled parts 11. As a result, it is possible to avoid a situation in which the adhesive plugs the axial grooves 8*d*1 of the bearing sleeve 8 as the adhesive is filled in the adhesive-filled parts 11. When the heating process is performed as described above, a slight amount of adhesive flows into the axial grooves 8*d*1 in the bearing sleeve 8 in some cases. However, the gap between the outer peripheral surface 8*d* of the bearing sleeve 8 and the inner peripheral surface 7*a*1 of the housing 7 is sufficiently smaller than the gap formed between the axial grooves 8*d*1 of the bearing sleeve 8 and the inner peripheral surface 7*a*1 of the housing 7. Therefore, the adhesive flowing into the axial grooves 8*d*1 side is drawn back by capillary force to the side bonded in a gap-filling manner.

Note that, for the purpose of evenly applying adhesive between the outer peripheral surface 8d of the bearing sleeve 8 and the inner peripheral surface 7a1 of the housing 7 so as to secure stable fixation strength therebetween, means such as vacuum suction may be simultaneously employed.

Further, adhesive used for bonding the housing 7 and the bearing sleeve 8 to each other is not limited to thermosetting adhesive, and anaerobic adhesive may be used therefor. In this case, as means for introducing adhesive between the outer peripheral surface 8d of the bearing sleeve 8 and the inner peripheral surface 7a1 of the housing 7, there may be employed, for example, vacuum suction.

The bearing sleeve 8 is fixed to the housing 7 as described above, and then the seal member 9 is fixed to the inner periphery of the upper end of the housing 7 by an appropriate means such as bonding, press-fitting, or press-fit bonding. When the fixation of the seal member 9 is completed, the seal space S is formed between the inner peripheral surface 9a of the seal member 9 and the outer peripheral surface 2a1 of the shaft part 2a. After that, the interior space of the housing 7, which includes an interior hole of the bearing sleeve 8 and is sealed with the seal member 9, is filled with a lubricating oil as a lubricating fluid, whereby the fluid dynamic bearing device 1 illustrated in FIG. 1 is completed.

In the fluid dynamic bearing device 1 having the above-mentioned structure, when the shaft member 2 is rotated, the upper and lower two regions that constitute the radial bearing surfaces of the inner peripheral surface 8a of the bearing sleeve 8 face the outer peripheral surface 2a1 of the shaft part 2a with each other through an intermediation of the radial bearing gaps, respectively. Then, in accordance with the rotation of the shaft member 2, oil films formed in the radial bearing gaps are increased in oil-film rigidity by the dynamic pressure action of the dynamic pressure grooves 8a1, 8a2 formed in the radial bearing surfaces, respectively. The shaft member 2 is rotatably supported by the dynamic pressure in a radial direction in a non-contact manner. With this, the first radial bearing part R1 and the second radial bearing part R2 for rotatably supporting the shaft member 2 in the radial direction in a non-contact manner are constituted.

Further, when the shaft member 2 is rotated, a region that constitutes the thrust bearing surface of the lower end surface 8b of the bearing sleeve 8 faces the upper end surface 2b1 of the flange part 2b through an intermediation of the thrust bearing gap, and a region that constitutes the thrust bearing surface of the inner bottom surface 7b1 of the housing bottom part 7b faces the lower end surface 2b2 of the flange part 2b through an intermediation of the thrust bearing gap. Then, in accordance with the rotation of the shaft member 2, oil films formed in both the thrust bearing gaps are increased in oil-film rigidity by the dynamic pressure action of the dynamic pressure grooves formed in the thrust bearing surfaces, respectively. The shaft member 2 is rotatably supported by the dynamic pressure in both the thrust directions in a non-contact manner. With this, the first thrust bearing part T1 and the second thrust bearing part T2 for rotatably supporting the shaft member 2 in both the thrust directions in a non-contact manner are constituted.

Further, as described above, the dynamic pressure grooves 8a1 of the first radial bearing part R1 are formed asymmetrical in the axial direction with respect to the axial direction center m. The axial direction dimension X1 in the region on the upper side of the axial direction center m is set larger than the axial direction dimension X2 in the region on the lower side of the axial direction center m (refer to FIG. 3). Therefore, when the shaft member 2 is rotated, the drawing force (pumping force) for the lubricating oil by the dynamic pressure grooves 8a1 is relatively large in the upper region compared with the lower region. The lubricating oil filled in the gap between the inner peripheral surface 8a of the bearing sleeve 8 and the outer peripheral surface 2a1 of the shaft part 2a flows downwardly, with a differential pressure of this drawing force, and circulate through a path constituted by the thrust bearing gap of the first thrust bearing part T1, the communication path formed by the axial grooves 8d1, the annular concave part of the lower end surface 9b of the seal member 9, the annular groove 8c1, and the radial direction grooves 8c2 in the stated order, so as to be drawn into the radial bearing gap of the first radial bearing part R1 again. By constituting the fluid dynamic bearing device 1 such that the lubricating oil flows and circulates in the interior space of the housing 7 in this way, it is possible to prevent a phenomenon in which the pressure of the lubricating oil in the interior space locally becomes negative pressure and to solve the problems such as generation of air bubbles involved in generation of the negative pressure, leakage of the lubricating oil and occurrence of vibration resulted from the generation of air bubbles. Even when air bubbles are mixed in the lubricating oil because of some reason, the air bubbles are discharged to the outside air from the oil surface (air liquid interface) of the lubricating oil in the seal space S when the air bubbles circulate with the lubricating oil, the adverse effect due to the air bubbles is more effectively prevented.

Note that, in the last paragraph, while description is made on the case where the circulation path extending from the upper end part of the axial grooves 8d1 to the radial bearing gap is constituted by the annular concave part of the lower end surface of the seal member 9, the annular groove 8c1, and the radial direction grooves 8c2, the constitution thereof is arbitrary. For example, the circulation path can be constituted by a radial groove across the lower end surface 9b of the seal member 9 or the upper end surface 8c of the bearing sleeve 8 in the radial direction.

As described above, in the present invention, the press-fitting part 10 and the adhesive-filled parts 11 are provided between the housing 7 and the bearing sleeve 8 in an axial direction while being superimposed on each other. The volume of the adhesive-filled parts 11 can be arbitrarily set, and hence through appropriate setting thereof, it is possible to control the amount of the adhesive to be interposed between the inner peripheral surface 7a1 of the housing 7 and the outer peripheral surface 8d of the bearing sleeve 8. Accordingly, as a result of additional interposition of the adhesive on the opening side of the bearing sleeve 8, it is possible to additionally provide a part bonded in a gap-filling manner between the housing 7 and the bearing sleeve 8, and possible to further increase fixation strength therebetween as compared with the case of merely performing press-fit bonding therebetween.

Further, with the structure described above, when the bearing sleeve 8 is fixed to the inner periphery of the housing 7, the bearing sleeve 8 is press-fitted to the inner periphery of the housing 7, and then the adhesive-filled parts 11 are filled with adhesive, and thereafter, the adhesive can be introduced between the housing 7 and the bearing sleeve 8. With this, at the time of press-fitting the bearing sleeve 8, it is possible to prevent a situation in which the adhesive flows therearound (on the bottom part side of housing 7) to the forward side in the moving direction, and possible to secure desired fixation strength between the housing 7 and the bearing sleeve 8. Further, it is also possible to prevent a failure that the shaft member 2 is fixed by bonding. With the above-mentioned configurations, fixation strength of the bearing sleeve 8 can be increased with respect to the housing 7 without involving deterioration of bearing performance, whereby stable bearing performance is achieved. As a matter of course, prior to press-fitting of the bearing sleeve 8, adhesive is applied to the extent that those problems are prevented from occurring.

Note that, the axial grooves provided as the adhesive-filled parts 11 in the inner peripheral surface 7a1 of the housing 7 are provided at circumferential positions different from those of the axial grooves 8d1 provided in the outer peripheral surface 8d of the bearing sleeve 8, and hence there is no risk that the axial grooves 8d1 are plugged with the adhesive as the adhesive is filled therein. Accordingly, there is no risk that the fluid circulation of the lubricating oil is hindered by the adhesive, and hence stable bearing performance can be achieved also from this point.

Further, the housing 7 is formed by injection molding of a resin, and hence the housing 7 structured as described above can be manufactured at lower cost, whereas it is possible to avoid deterioration in accuracy of the inner peripheral surface of the bearing sleeve 8, that is, in width accuracy of the radial bearing gap, the deterioration being caused in accordance with the press-fitting of the bearing sleeve 8.

Figure 5:
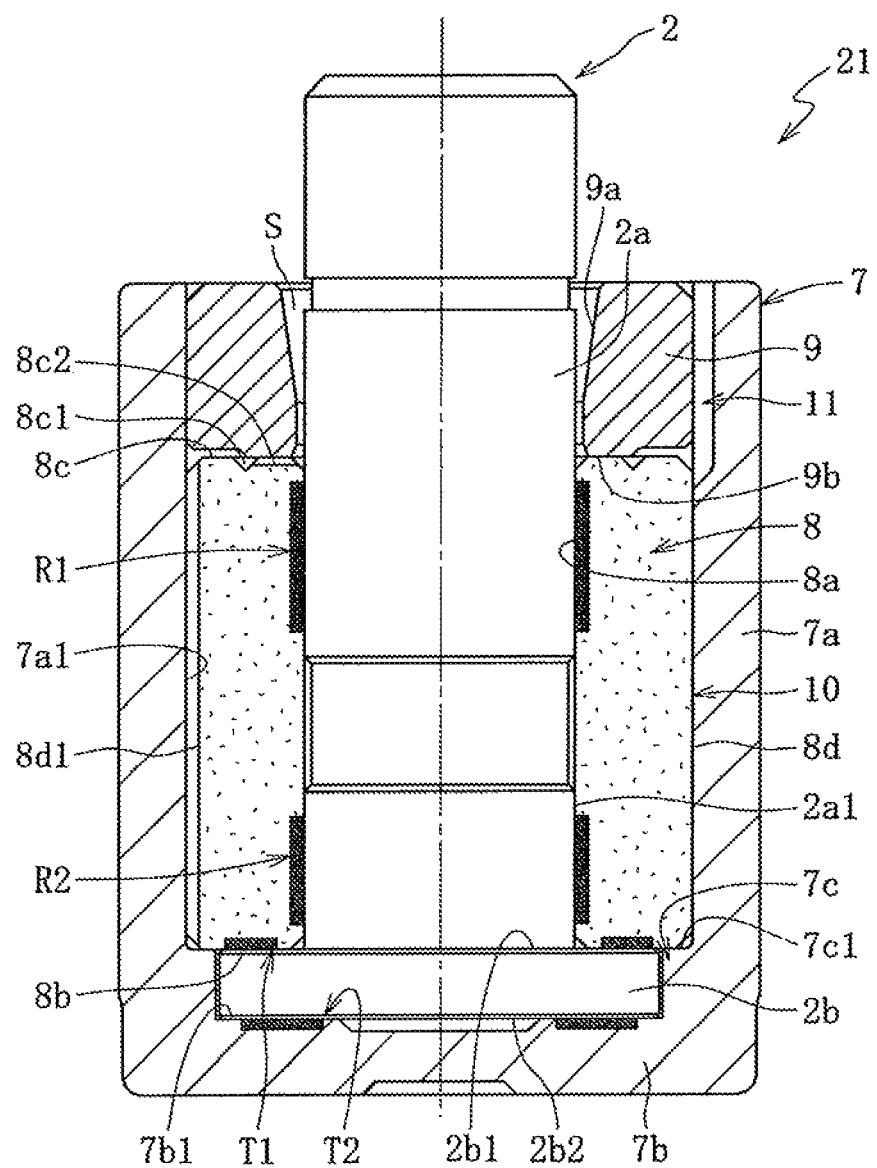
FIG. 5 is a sectional view illustrating a second embodiment of the fluid dynamic bearing device.

FIG. 5 illustrates a second embodiment of the fluid dynamic bearing device of the present invention. A fluid dynamic bearing device 21 illustrated in the figure is different from the fluid dynamic bearing device 1 illustrated in FIG. 2 mainly in that a step part 7c is provided on the inner side of the boundary part between the side part 7a and the bottom part 7b of the housing 7. The step part 7c is set to have an axial length equal to the total amount of the thickness of the flange part 2b of the shaft member 2 and both the thrust bearing gaps. Accordingly, when the bearing sleeve 8 is positioned with respect to the housing 7, the bearing sleeve 8 keeps on being inserted until the lower end surface 8b thereof is brought into contact with an upper end surface 7c1 of the step part of the housing 7, merely whereby the widths of both the thrust bearing gaps are set to predetermined values. Note that, other structural details correspond those of the embodiment illustrated in FIG. 2, and redundant description thereof is omitted by adding the same reference symbols thereto.

Figure 6:
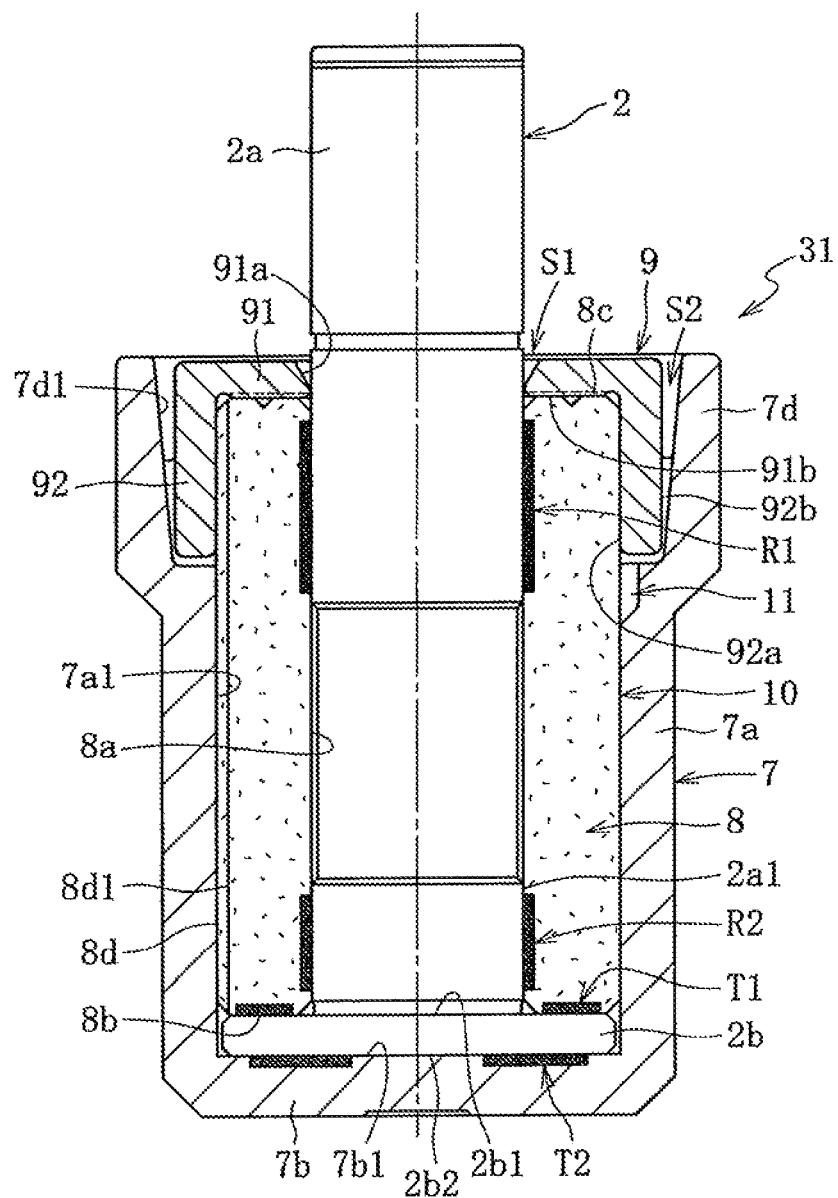
FIG. 6 is a sectional view illustrating a third embodiment of the fluid dynamic bearing device.
Figure 7:
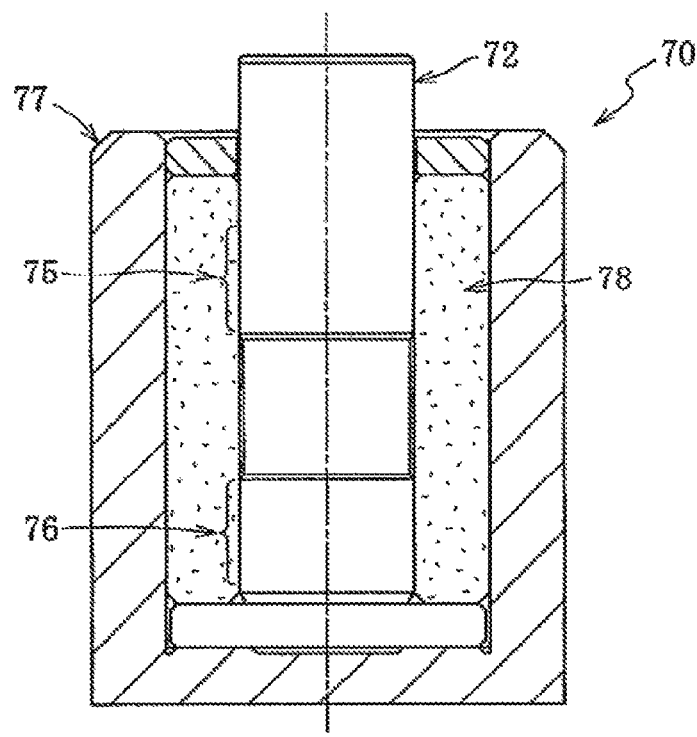
FIG. 7 is a sectional view of a fluid dynamic bearing device of a conventional structure.

FIG. 6 illustrates a third embodiment of the fluid dynamic bearing device of the present invention. A fluid dynamic bearing device 31 illustrated in the figure is different from the fluid dynamic bearing device 1 mainly in that the housing 7 integrally has, on the upper part side of the side part 7a, a seal formation part 7d having diameter larger than that of the side part 7a, and in that the seal member 9 is formed in a reverse L-shaped cross section while being constituted by a disk-like first seal part 91 and a cylindrical second seal part 92 projecting downward from a radially outer side of the first seal part 91. In this structure, a first seal space S1 having a predetermined volume is formed between an inner peripheral surface 91a of the first seal part 91 and the outer peripheral surface 2a1 of the shaft part 2a, and a second seal space S2 having a predetermined volume is formed between an outer peripheral surface 92b of the second seal part 92 and an inner peripheral surface 7d1 of the seal formation part 7d of the housing 7. The seal member 9 is fixed while a lower end surface 91b of the first seal part 91 is brought into contact with the upper end surface 8c of the bearing sleeve 8, and an inner peripheral surface 92a of the second seal part 92 is fitted to the outer peripheral surface 8d of the bearing sleeve 8.

In the fluid dynamic bearing device 31 structured as described above, a seal space is formed not only on the inner peripheral side of the seal member 9, but also on the outer peripheral side thereof. The seal space has a volume sufficient for absorbing volume change caused in accordance with temperature change of the lubricating oil filled in the interior space of the housing 7. Accordingly, in the structure of this embodiment, the second seal space S2 is provided also on the outer peripheral side of the seal member 9, and hence the volume of the seal spaces can be increased even when the axial dimension of the housing 7 is the same as those in the other embodiments. Thus, with the structure of the fluid dynamic bearing device 31 illustrated in the figure, for example, the axial length of the bearing sleeve 8, in other words, the bearing span between both the radial bearing parts R1, R2, can be made larger than that in the structure illustrated in FIG. 2 without involving increase in axial dimension of the housing 7, whereby moment rigidity can be increased. Note that, other structural details correspond to those of the embodiment illustrated in FIG. 2, and redundant description thereof is omitted by adding the same reference symbols thereto.

In the fluid dynamic bearing devices described above, while the axial grooves as the adhesive-filled parts 11 are provided in the inner peripheral surface 7a1 of the housing 7, the adhesive-filled parts 11 may be constituted by the axial grooves provided in the outer peripheral surface 8d of the bearing sleeve 8. In this case, both the axial grooves as the adhesive-filled parts 11 and the axial grooves 8d1 functioning as communication paths are formed in the bearing sleeve 8. Thus, when the bearing sleeve 8 is press-fitted to the housing 7, it becomes unnecessary to consider the peripheral position of the bearing sleeve 8, whereby assembly thereof can be simplified.

Further, in the structure described above, communication paths (axial grooves 8d1) for communicating both the end surfaces of the bearing sleeve 8 each other are formed in the outer peripheral surface 8d of the bearing sleeve 8. The communication paths may be formed of the axial grooves provided in the inner peripheral surface 7a1 of the housing 7. In this case, similarly to the above-mentioned structure, the adhesive-filled parts 11 and the communication paths are provided only in the housing 7. Thus, when the bearing sleeve 8 is press-fitted to the housing 7, it becomes unnecessary to consider the peripheral position of the bearing sleeve 8, whereby assembly thereof can be simplified. When the housing 7 is formed by injection molding of a resin as described above, the axial grooves of the inner peripheral surface 7a1 can be formed by die molding simultaneously with the injection molding. Thus, it is possible to avoid increase in cost of the housing 7, which is involved with provision of the axial grooves.

Further, the adhesive-filled parts 11 may be constituted by axial grooves provided in both the inner peripheral surface 7a1 of the housing 7 and the outer peripheral surface 8d of the bearing sleeve 8.

Further, in the case described above, the adhesive-filled parts 11 are constituted by the axial grooves. The adhesive-filled parts 11 are not necessarily constituted by the axial grooves as described above, and may be constituted by dents (dimples) or the like.

Further, in the above description, the housing 7 is formed in a bottomed cylindrical shape in which the side part 7a and the bottom part 7b are integrally formed with each other. Even when the side part 7a and the bottom part 7b are separated from each other, the structure of the present invention can be suitably employed.

Further, in the above description, the structure of generating the dynamic pressure action of the lubricating oil by the dynamic pressure grooves of a herringbone shape or a spiral shape is illustrated as the radial bearing parts R1, R2 and the thrust bearing parts T1, T2. A so-called step bearing, multilobe bearing, or noncircular bearing may be adopted as the radial bearing parts R1, R2. A so-called step bearing or wave bearing may be adopted as the thrust bearing parts T1, T2. Further, when the radial bearing parts are constituted by the step bearing or the multirobe bearing, like the radial bearing parts R1, R2, two radial bearing parts may be spaced apart from each other in the axial direction, or a single radial bearing part may be provided over the upper and lower regions on the inner peripheral side of the bearing sleeve 8. In addition, it is possible to adopt, as the radial bearing parts R1, R2, a so-called cylindrical bearing devoid of dynamic pressure grooves, and to adopt, as the trust bearing parts, a so-called pivot bearing for supporting one end of the shaft member while being held in contact therewith.

In the above-mentioned embodiments, a lubricating oil is illustrated as a lubricating fluid filling the interior of the fluid dynamic bearing device. Otherwise, gas such as air or a magnetic fluid or the like may be used.

Description of Reference Symbols
1 fluid dynamic bearing device
2 shaft member
2a shaft part
2b flange part
7 housing
8 bearing sleeve
8d1 axial groove (communication path)
9 seal member
10 press-fitting part
11 adhesive-filled part
R1, R2 radial bearing part
T1, T2 thrust bearing part
S seal space

The invention claimed is:

1. A fluid dynamic bearing device, comprising:
a housing having a bottomed cylindrical shape comprising a cylindrical side part, a bottom part, and an open end, the cylindrical side part and the bottom part being provided as one integrally-formed part, the bottom part and the open end being provided at opposite sides in an axial direction of the bottomed cylindrical shape; and
a bearing sleeve fixed to an inner periphery of the housing, the bearing sleeve having an inner peripheral surface which faces radial bearing gaps in which a fluid film of a lubricating fluid is formed so that a shaft to be supported is supported therewith in a radial direction,
wherein the housing and the bearing sleeve have therebetween
a press-fitting part at which the housing and the bearing sleeve are fixed by press-fitting, and
an adhesive-filled part formed on a side of the open end of the housing with respect to the press-fitting part, the press-fitting part and the adhesive-filled part being superimposed on each other in the axial direction, and
wherein an adhesive has been filled in the adhesive-filled part via the open end of the housing, part of the adhesive having further been drawn into the press-fitting part, the adhesive being hardened in the press-fitting part and the adhesive-filled part so as to provide a part bonded in a press-fitting manner, that is press-fitting and bonding the housing and the bearing sleeve, and a part bonded in a gap-filling manner, that is bonding the housing and the bearing sleeve with the adhesive filled in a gap between the housing and the bearing sleeve,
wherein the housing further comprises a portion for housing a seal member inside of the inner periphery of the housing, the portion being provided on a side of the open end of the housing with respect to the bearing sleeve in the axial direction,
wherein the bearing sleeve further comprises a chamfered outer peripheral edge on the side of the open end of the housing, and
wherein the adhesive-filled part extends from the open end of the housing and passes the seal member and the chamfered outer peripheral edge of the bearing sleeve in the axial direction.

2. A fluid dynamic bearing device according to claim 1, further comprising, between the housing and the bearing sleeve, a communication path for communicating both end surfaces of the bearing sleeve with each other, wherein the communication path and the adhesive-filled part are provided at different positions in a circumferential direction.

3. A fluid dynamic bearing device according to claim 1, wherein the housing is formed by injection molding of a resin.

4. A fluid dynamic bearing device according to claim 1, wherein the adhesive-filled part is a groove whose longitudinal direction extends in the axial direction.

5. A method of manufacturing a fluid dynamic bearing device which comprises:
a housing having a bottomed cylindrical shape comprising a cylindrical side part, a bottom part, and an open end, the cylindrical side part and the bottom part being provided as one integrally-formed part, the bottom part and the open end being provided at opposite sides in an axial direction of the bottomed cylindrical shape; and
a bearing sleeve fixed to an inner periphery of the housing, the bearing sleeve having an inner peripheral surface which faces radial bearing gaps in which a fluid film of a lubricating fluid is formed so that a shaft to be supported is supported therewith in a radial direction, the housing further comprising a portion for housing a seal member inside of the inner periphery of the housing, the portion being provided on a side of the open end of the housing with respect to the bearing sleeve in the axial direction, the bearing sleeve further comprising a chamfered outer peripheral edge on the side of the open end of the housing, the adhesive-filled part extending from the open end of the housing and passes the seal member and the chamfered outer peripheral edge of the bearing sleeve in the axial direction, the method comprising the steps of:
inserting the bearing sleeve into the inner periphery of the housing, while providing a press-fitting part between the housing and the bearing sleeve to fix the housing and the bearing sleeve by press-fitting and providing an adhesive-filled part between the housing and the bearing sleeve on a side of the open end of the housing with respect to the press-fitting part in a manner that the press-fitting part and the adhesive-filled part are superimposed on each other in the axial direction, then
filling the adhesive-filled part with adhesive via the open end of the housing after the press-fitting of the bearing sleeve to the inner periphery of the housing;
drawing part of the adhesive into the press-fitting part; and
hardening the adhesive in the adhesive-filled part and the adhesive in the press-fitting part so as to press-fit and bond the housing and the bearing sleeve on a side of the bottom part of the housing and to bond the housing and the bearing sleeve with the adhesive filled in a gap therebetween on a side of the open end of the housing.

6. A method of manufacturing a fluid dynamic bearing device according to claim 5, wherein said drawing the part of the adhesive is performed by heating the adhesive filled in the adhesive-filled part to soften the adhesive so that the part of the adhesive is drawn into the press-fitting part.

7. A fluid dynamic bearing device, comprising:

a housing having a bottomed cylindrical shape comprising a cylindrical side part, a bottom part, and an open end, the cylindrical side part and the bottom part being provided as one integrally-formed part, the bottom part and the open end being provided at opposite sides in an axial direction of the bottomed cylindrical shape; and a bearing sleeve fixed to an inner periphery of the housing, the bearing sleeve having an inner peripheral surface which faces radial bearing gaps in which a fluid film of a lubricating fluid is formed so that a shaft to be supported is supported therewith in a radial direction, wherein the housing and the bearing sleeve have therebetween a press-fitting part at which the housing and the bearing sleeve are fixed by press-fitting, and an adhesive-filled part formed on a side of the open end of the housing with respect to the press-fitting part, the press-fitting part and the adhesive-filled part being superimposed on each other in the axial direction, and wherein an adhesive has been filled in the adhesive-filled part via the open end of the housing, part of the adhesive having further been drawn into the press-fitting part, the adhesive being hardened in the press-fitting part and the adhesive-filled part so as to provide a part bonded in a press-fitting manner, that is press-fitting and bonding the housing and the bearing sleeve, and a part bonded in a gap-filling manner, that is bonding the housing and the bearing sleeve with the adhesive filled in a gap between the housing and the bearing sleeve, and wherein the adhesive-filled part is a groove whose longitudinal direction extends in the axial direction.

8. A fluid dynamic bearing device according to claim 7, further comprising, between the housing and the bearing sleeve, a communication path for communicating both end surfaces of the bearing sleeve with each other, wherein the communication path and the adhesive-filled part are provided at different positions in a circumferential direction.

9. A fluid dynamic bearing device according to claim 7, wherein the housing is formed by injection molding of a resin.

* * * * *